(12) United States Patent
Kessinger

(10) Patent No.: US 8,576,085 B2
(45) Date of Patent: Nov. 5, 2013

(54) CAPACITANCE-TYPE LIQUID LEVEL MEASURING PROBE

(75) Inventor: Thomas R. Kessinger, Hillsboro, OH (US)

(73) Assignee: Tektronix, Inc., Beaverton, OR (US)

( * ) Notice: Subject to any disclaimer, the term of this patent is extended or adjusted under 35 U.S.C. 154(b) by 443 days.

(21) Appl. No.: 12/942,337

(22) Filed: Nov. 9, 2010

(65) Prior Publication Data

US 2011/0175729 A1 Jul. 21, 2011

Related U.S. Application Data

(60) Provisional application No. 61/295,661, filed on Jan. 15, 2010.

(51) Int. Cl.
G08B 21/00 (2006.01)
G01F 23/00 (2006.01)

(52) U.S. Cl.
USPC .................. 340/612; 340/620; 73/304 C

(58) Field of Classification Search
USPC ......... 340/602, 603, 604, 605, 612, 618, 620, 340/623, 624, 450, 450.2, 450.3; 62/6, 606, 62/615; 73/32 A, 304 C, 308, 313; 324/601; 702/45, 55, 100, 104
See application file for complete search history.

(56) References Cited

U.S. PATENT DOCUMENTS

| 3,236,091 | A | * | 2/1966 | Cohn | 324/601 |
| 4,193,291 | A | * | 3/1980 | Lynnworth | 73/32 A |
| 5,146,784 | A | * | 9/1992 | Maresca et al. | 73/313 |
| 6,016,697 | A | * | 1/2000 | McCulloch et al. | 73/304 C |
| 6,291,770 | B1 | * | 9/2001 | Casperson | 174/72 A |
| 6,617,968 | B1 | * | 9/2003 | Odisho et al. | 340/450.3 |
| 7,003,418 | B2 | * | 2/2006 | Bonne et al. | 702/100 |
| 2011/0270542 | A1 | * | 11/2011 | Chappell et al. | 702/55 |

* cited by examiner

*Primary Examiner* — Van T. Trieu
(74) *Attorney, Agent, or Firm* — Thomas F. Lenihan; Marger, Johnson & McCollom, P.C.

(57) ABSTRACT

A capacitance-type liquid measuring probe 10 includes two concentric metallic tubes 12 and 14 extending downwardly into a tank of oil. The concentric metallic tubes 12 and 14 form the plates of a capacitor. The probe 10 measures the oil level in the tank during jet engine testing by detecting a change in electrical capacitance between the two concentric metallic tubes 12 and 14, the capacitance change being caused by a change in the level of the oil. The measuring circuitry 30 includes thermal compensating resistors and a temperature-stabilized detector. The measurement electronic circuit package is separately-housed and connected to the probe 10 via a cable 44 so that the circuitry 30 can be located remotely from the hot environment in which the probe 10 operates.

11 Claims, 5 Drawing Sheets

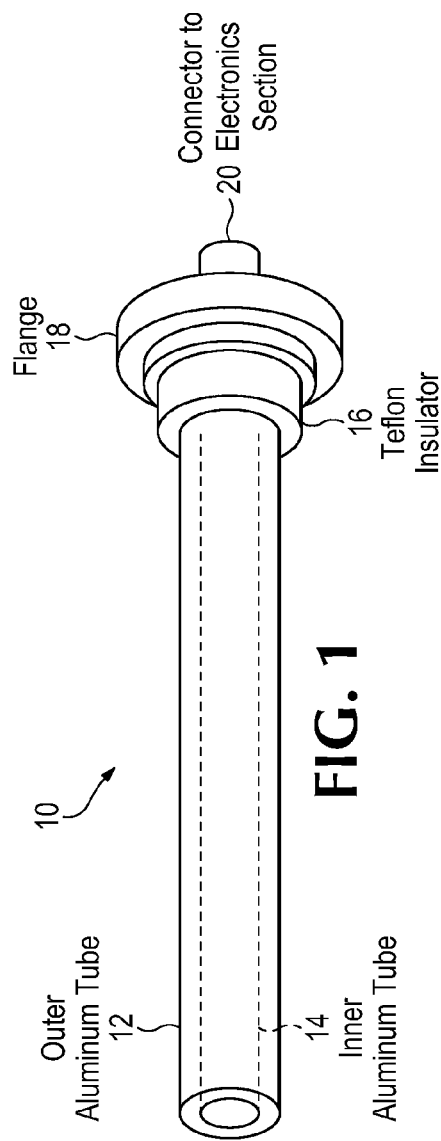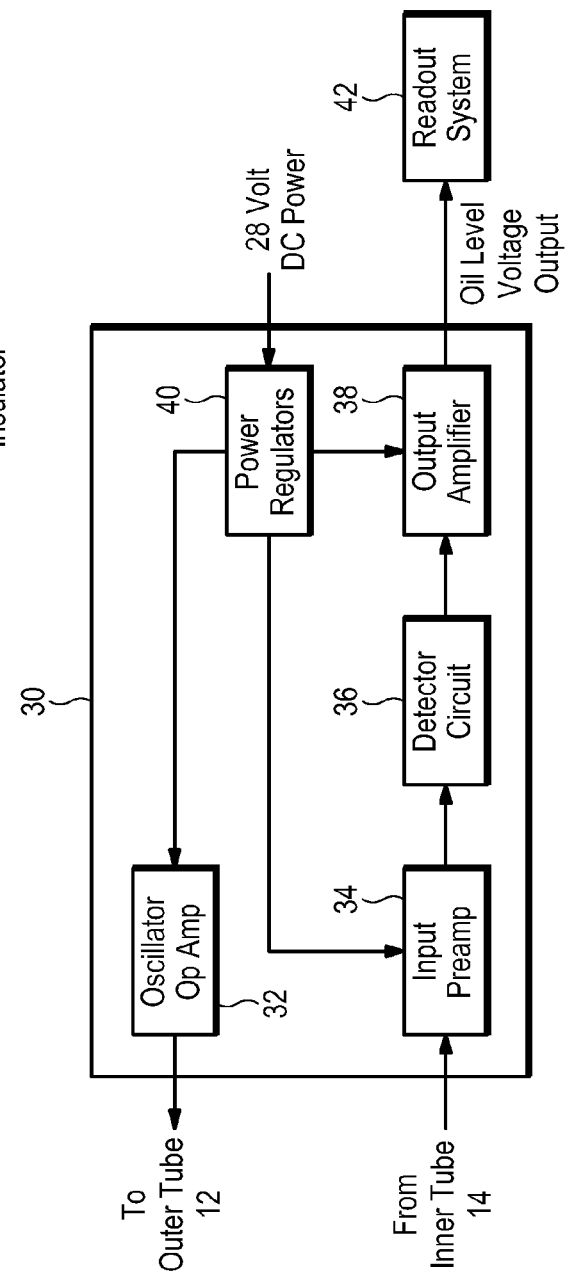

ZTX 651 transistors mounted in the same heatsink

CAPACITANCE-TYPE LIQUID LEVEL MEASURING PROBE

BACKGROUND OF THE INVENTION

Capacitance-type oil level measuring devices work on the principle of detecting changes in electrical capacitance between two insulated metal plates when a liquid is introduced between the plates. Typically, these devices employ a small diameter pipe for one plate of the capacitor inside of a larger pipe that serves as the second plate. An electronic processor connects to the two plates and converts a change in capacitance to a voltage level that is sent to a read out system to indicate the gallons of liquid present. Such a probe is known in the prior art from P/N 74-113-1, manufactured by Meggitt Avionics, Inc., Manchester, N.H.

In use, these probes are mounted on top of an aluminum oil tank with the probe end extending downward into the oil to a location near the bottom of the tank. Such probes typically can measure in a range from about 8 gallons down to 1.5 gallons. The electronics section of the prior art probes is mounted directly on top of the probe, thus transferring any heat from the oil into the electronic components. Electronic components (e.g., transistors, resistors, etc.) are heat sensitive and change characteristics with every incremental change in temperature. The oil in these tanks can reach temperatures of over 100 degrees centigrade. The prior art probes have no thermal compensation and were therefore subject to thermal drift. As a result of this thermal drift when the prior art probe heats up, its output increases, making it appear that more oil is available after running the engine, than was available before running the engine. Clearly, this is an erroneous and undesirable outcome.

Moreover, due to the heat and vibration, such a prior art probe has been known to leak water into its electronics compartment, thereby adversely affecting its operation even more.

SUMMARY OF THE INVENTION

A capacitance-type liquid level measuring probe includes two concentric metallic tubes extending downwardly into a tank of oil. The concentric metallic tubes form the plates of a capacitor. The probe measures the oil level in the tank during jet engine testing by detecting a change in electrical capacitance between the two concentric metallic tubes, the capacitance change being caused by a change in the level of the oil. The measuring circuitry includes thermal compensating resistors and/or diodes and a temperature-stabilized detector. The measurement electronic circuit package is separately-housed and connected to the probe via a cable so that the circuitry can be located remotely from the hot environment in which the probe operates.

FIG. 1 shows a simplified side view of the probe of the subject invention.

FIG. 2 is a block diagram of the electronics employed in accordance with the subject invention.

DETAILED DESCRIPTION OF THE DRAWING

The application for these probes is to measure the oil consumption on test runs of jet engines mounted on ground test stands. The engine is run through various tests to check its performance and its oil consumption must fall within stringent limits.

Figure 4:
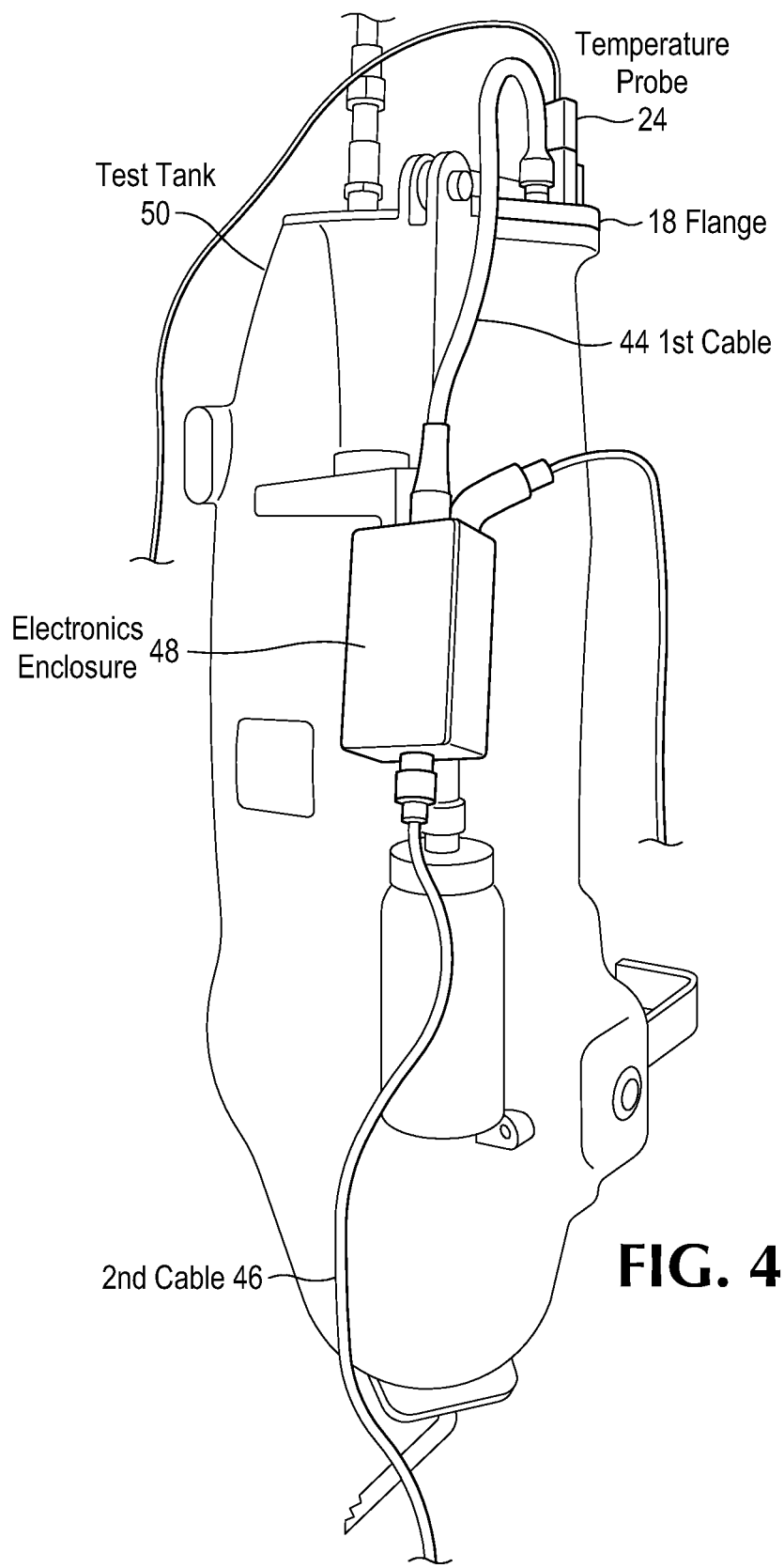
FIG. 4 shows a probe in accordance with the subject invention mounted in an oil tank.

Referring to FIG. 1, a capacitive-type liquid level measuring probe 10 according to the subject invention includes two metallic plates, which in the embodiment shown, are two concentric metallic tubes 12 and 14, spaced apart from each other. A first end of the pair of metallic tubes is attached to a Teflon insulator 16, which is in turn, coupled to a flange 18. The flange 18 may be made of aluminum and is used to securely mount the probe to an oil tank, as shown in FIG. 4. A gasket (not shown) is placed between the flange 18 on the oil probe and the tank and then the probe 10 is securely bolted on to the tank. A second end of the pair of metallic tubes extends downwardly into a pool of oil when the probe is mounted in the oil tank.

The metallic tubes 12 and 14 can be made of copper, steel, or stainless steel. However, for corrosion considerations, the tubes 12 and 14 are preferably made of anodized aluminum or stainless steel. The Teflon mounting and insulator 16 is used because of its ability to withstand high temperatures and for its toughness. As noted above, the oil in the tank can reach a temperature of over 100 degrees C.

A connector 20 is mounted on the flange 18. Its contacts form a conductive path between the plates of the capacitor (metallic tubes 12 and 14) and a remotely mounted electronics package. Wiring to the connector 20 is soldered to the tubes 12 and 14, using a special solder and flux. The special flux and solder is AL-Solder 500, manufactured by Harris. Soldering the wires to the tubes eliminates the necessity of using rivets, which can come loose. Loose rivets may be a cause of the erratic oil level indication mentioned above, since the prior art probes do have riveted connections.

As noted above, the probe 10 is connected by a cable to a remotely-mounted enclosure that holds the detecting and amplifying circuitry. Remotely mounting the electronics, as opposed to mounting the electronics on the probe itself, prevents the circuitry from being adversely affected by heat transferred from the hot oil.

FIG. 2 is a block diagram of the electronics section 30 employed in accordance with the subject invention. An oscillator operational amplifier (Op Amp) 32 applies a constant level triangle wave of about 3 volts to the outside tube 12 via a first cable 44 (see FIG. 4). This signal is picked up and amplified by an input preamplifier 34 that is coupled to the inner tube 14 via the first cable 44. The oil and the tubes 12 and 14 form a variable capacitor. As the oil level increases, so does the capacitance. With greater capacitance, there is therefore higher coupling of the signal to the preamp 34. As the oil level in the tank decreases the voltage output decreases accordingly. A power regulator block 40 receives a DC voltage of 28V via a second cable 46 (see FIG. 4) and provides voltages to the Op Amp 32, the input preamp 34 and an output amplifier 38. The output amplifier 38 provides an output representing the oil level to a readout system 42 via the second cable 46. The readout system 42 shows the oil level on a display (not shown).

Figure 3:
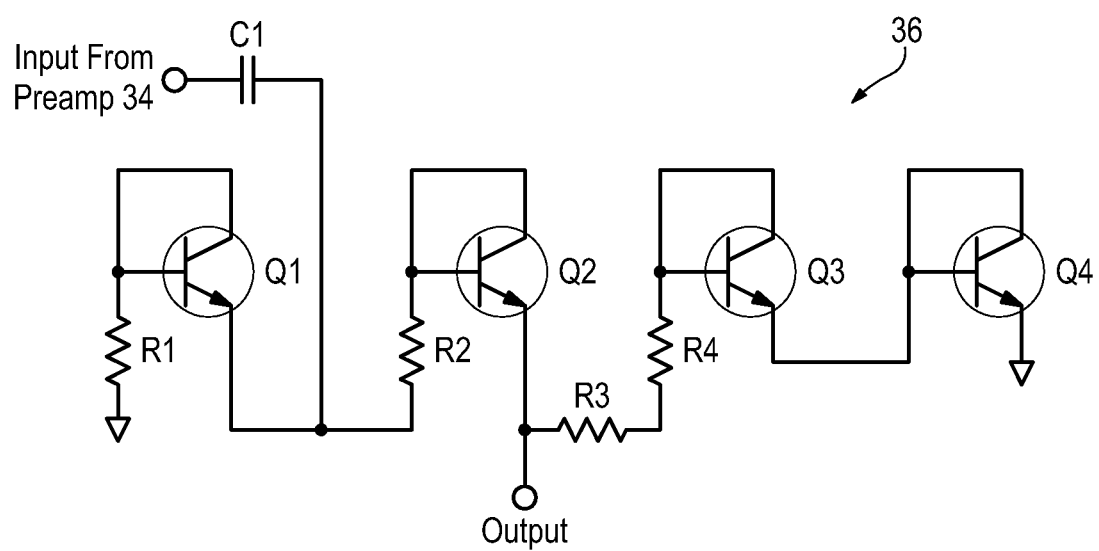
FIG. 3 shows, in schematic form, a more detailed diagram of the detector circuit of FIG. 2.

We measure oil level with a DC voltage indication. The detector circuit 36, shown in FIG. 3, changes the ac triangle wave signal to a DC level. The probe reads from 0 to 9 volts, 9 volts indicating a full tank. The detector circuit 36 consists of four transistors Q1-Q4 wired in a diode configuration. A coupling Capacitor C1 couples the output of preamplifier 34 to the input of detector 36. Transistors Q1 and Q2 in combination with capacitor C1, are used as a voltage doubler that converts the signal to a 2× dc level. Transistors Q3 and Q4 are used like thermistors to temperature stabilize the detector output. Further thermal compensating diodes and thermistors may be used. One skilled in the art will note that the design of FIG. 3 uses planer transistors connected in a unique way to compensate for temperature changes.

Figure 5:
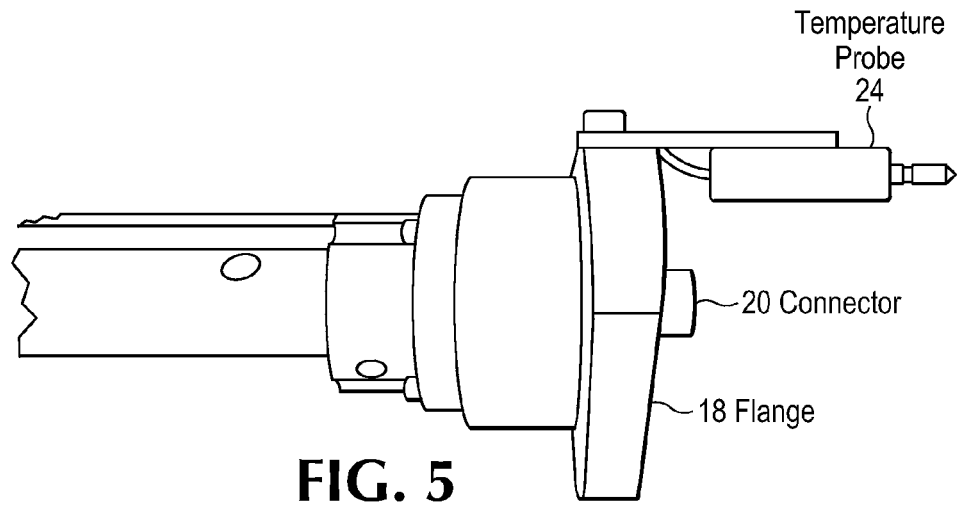
FIG. 5 shows a close-up view of the flange end of the probe of the subject invention.
Figure 6:
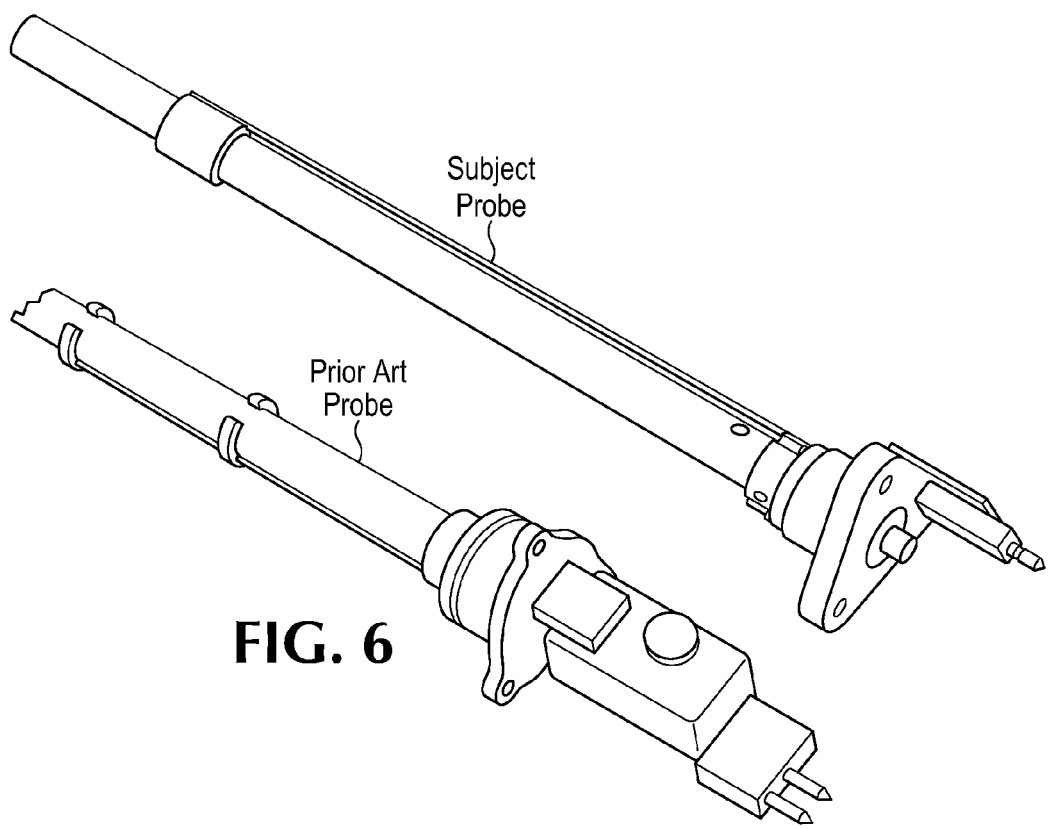
FIG. 6 shows a side-by-side comparison of a prior art probe and a probe according to the subject invention.

FIG. 5 shows a close-up view of the flange end of the probe of the subject invention. Another feature of the subject probe that is not found in the prior art Meggitt Avionics probe is a connection for a temperature probe 24 to satisfy a need of some aircraft engines manufacturers for a direct temperature measurement. The temperature probe 24 may have a thermocouple to detect the temperature of the oil.

Figure 7:
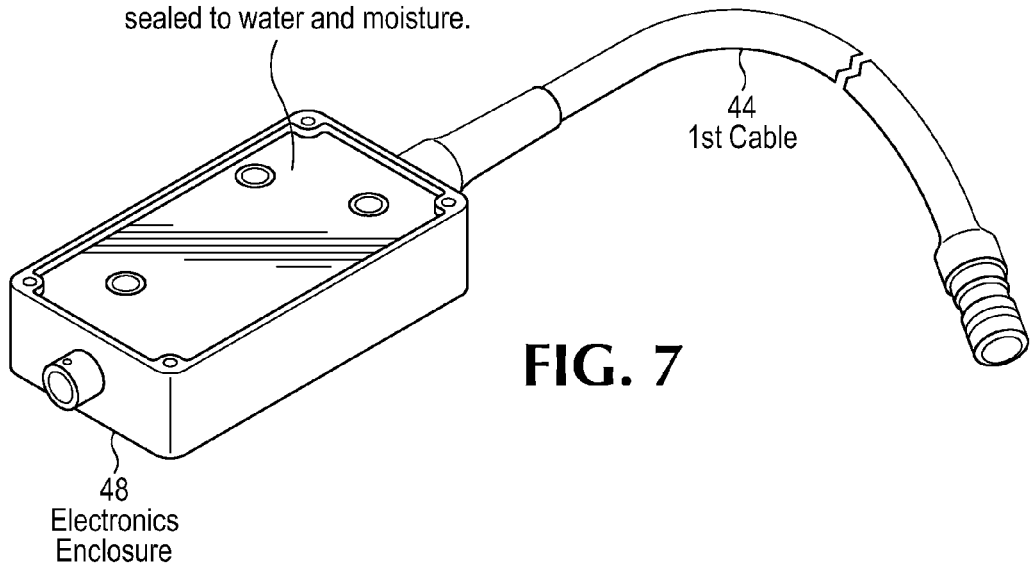
FIG. 7 shows the electronics box in accordance with the subject invention.
Figure 8:
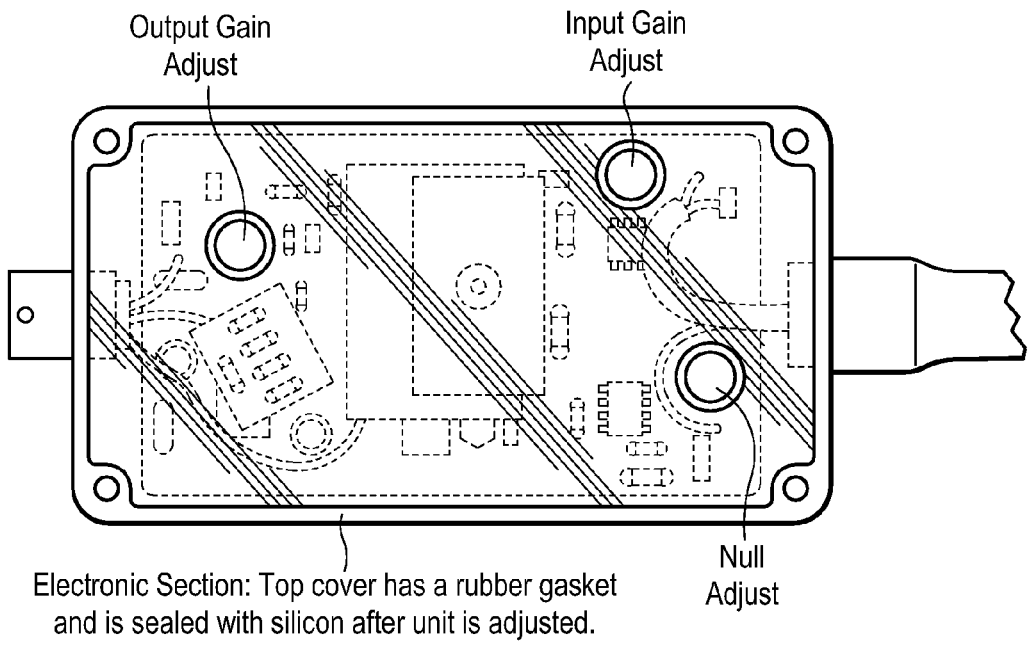
FIG. 8 shows a close-up view of the electronic circuitry of FIG. 2.

FIGS. 7 and 8 show the electronics enclosure 48. The electronics section 30 is potted in clear silicon to make the unit more stable for vibration and sealed to water and moisture. The enclosure 48 has a top cover (not shown) which has a rubber gasket and which is sealed with silicon after the unit is adjusted for proper operation. An input gain adjust potentiometer may be replaced with selected resistors for better stability. In addition, the cable 44 may be covered with stainless steel braid to protect it.

The accuracy of subject probe is initially about the same as the prior art probe. That is, an accuracy of +/−0.5% of the full scale voltage output, repeatability from the previous calibration, which is approximately +/−0.3 pints. This level of accuracy satisfies the requirements of aircraft engine manufacturers. However, all engines use some oil during testing, and the subject probe provides a more accurate delta between start level and the finish level.

Although particular embodiments have been described, it will be appreciated that the principles of the invention are not limited to those embodiments. Variations and modifications may be made without departing from the principles of the invention as set forth in the following claims.

What is claimed is:

1. A liquid level measuring probe comprising:
   a capacitive sensor extending into a liquid in a tank with the capacitance of the sensor changing depending on the level of the liquid;
   an electronic circuitry for providing a signal representing the level of the liquid by detecting the capacitance of the capacitive sensor, said electronic circuitry being located remotely from the capacitive sensor and comprises a temperature-stabilized detector including at least two transistors; and
   a cable for electrically coupling the capacitive sensor to the electronic circuitry.

2. The liquid level measuring probe as recited in claim 1 further comprising a readout system for indicating the level of the liquid in response to the signal representing the level of the liquid produced by the electronic circuitry.

3. The liquid level measuring probe as recited in claim 1 wherein the capacitive sensor comprises two concentric metallic tubes having no direct electrical connection there between.

4. The liquid level measuring probe as recited in claim 3 wherein the electronic circuitry provides a wave signal to the one of the tubes and receives a signal from the other of the tubes for providing the signal representing the level of the liquid.

5. The liquid level measuring probe as recited in claim 1 wherein the electronic circuitry comprises thermal compensating resistors.

6. The liquid level measuring probe as recited in claim 1 wherein the electronic circuitry is packaged with silicon in an enclosure to stabilize the electronic circuitry against vibration and to seal the electronic circuitry from water and moisture.

7. The liquid level measuring probe as recited in claim 1 further comprising a temperature sensor having a thermocouple for detecting temperature of the liquid.

8. The liquid level measuring probe as recited in claim 1 wherein the liquid is oil for an engine.

9. The liquid level measuring probe as recited in claim 1 wherein the cable may be covered with stainless steel braid.

10. The liquid level measuring probe as recited in claim 1 wherein the at least two transistors are wired in a diode configuration.

11. The liquid level measuring probe as recited in claim 1 wherein the electronic circuitry further comprises a voltage doubler including at least two additional transistors in combination with a capacitor.

\* \* \* \* \*